United States Patent [19]

Obata

[11] Patent Number: 4,846,017
[45] Date of Patent: Jul. 11, 1989

[54] SPEED REDUCTION CLUTCH MECHANISM

[75] Inventor: Mitsuyoshi Obata, Kobe, Japan

[73] Assignee: Kabushiki Kaisha Kobe Seiko Sho, Kobe, Japan

[21] Appl. No.: 150,045

[22] Filed: Jan. 29, 1988

[30] Foreign Application Priority Data

Feb. 13, 1987 [JP] Japan .................................. 62-31267

[51] Int. Cl.[4] .......................... F16H 3/44; F16H 57/10
[52] U.S. Cl. ........................................ 74/789; 192/184
[58] Field of Search ........................ 74/789; 192/18 A; 901/25, 24, 23

[56] References Cited

U.S. PATENT DOCUMENTS

| 2,884,812 | 5/1959 | Reis | 74/789 X |
| 3,971,461 | 7/1976 | Conroy et al. | 192/18 A |
| 4,567,788 | 2/1986 | Miller | 74/789 |

*Primary Examiner*—Dirk Wright
*Attorney, Agent, or Firm*—Oblon, Spivak, McClelland, Maier & Neustadt

[57] ABSTRACT

A speed reduction clutch mechanism which enables construction of an inexpensive driving system of a simple structure and can be conveniently incorporated in a driving system of an arm of a robot of the direct teaching type. The mechanism includes a reduction gear including input and output shafts and a body frame supported for rotation around a common axis. The input shaft is connected to an output shaft of a motor. A first arresting mechanisms is provided for arresting rotation of the body frame of the reduction gear. When the first arresting mechanisms is not in its arresting condition, a second arresting mechanisms couples the body frame to the output shaft of the reduction gear thereby to establish an integrally rotating relationship between the output shaft of the reduction gear and the output shaft of the motor. A switching mechanisms alternately renders the first and second arresting mechanisms operative. Where the mechanism is incorporated in a driving system of a robot of the direct teaching type, the output shaft of the reduction gear is connected to the arm.

11 Claims, 4 Drawing Sheets

SPEED REDUCTION CLUTCH MECHANISM

BACKGROUND OF THE INVENTION

1. Field of the Invention

This invention relates to a mechanism which has a speed reducing function and a function as a clutch when power is transmitted, and more particularly to a speed reduction clutch mechanism which is particularly useful for a driving system of a robot of the direct teaching type.

2. Prior Art

In directly teaching a robot which employs a reduction gear of a high reduction ratio, an output shaft of a servo motor serving as a driving source is rotated by way of a reduction gear. Accordingly, the operating force required when an operator operates an arm of the robot is very large.

Thus, a conventional driving system of a robot of the direct teaching type employs such a construction as, for example, shown in FIG. 6.

In particular, referring to FIG. 6, a servo motor 3 has an output shaft on which a detector 2 for controlling rotation of the motor 3 is mounted. The output shaft of the servo motor 3 is connected to an input shaft of a reduction gear 4 which in turn has an output power shaft connected to a driving force transmitting mechanism of an arm 1 by way of a clutch 5. Further, a detector 6 for exclusive use for teaching of the robot is directly connected to the driving force transmitting mechanism of the arm 1.

Accordingly, upon direct teaching of the robot, the arm 1 and the reduction gear 4 are disconnected from each other by the clutch 5 so that the load of the arm 1 may be reduced. Thus, a teaching position of the arm 1 reached by operation of the arm 1 by an operator is converted into position information by the detector 6 and transmitted to a controlling device (not shown).

On the other had, upon playback of the robot, the arm 1 and the reduction gear 4 are connected to each other by the clutch 5. Consequently, the arm 1 is driven at a predetermined reduction ratio with a predetermined driving torque under the control of the above-mentioned control device.

However, in the driving system of the construction described above, two detectors are necessitated, i.e., one for controlling of the rotation of the motor and the other for teaching of the robot. Accordingly, there is a problem that the driving system is complicated in structure and high in cost.

SUMMARY OF THE INVENTION

It is an object of the present invention to provide a speed reduction clutch mechanism which enables construction of an inexpensive driving system of a simple structure.

It is another object of the present invention to provide a speed reduction clutch mechanism which can be conveniently incorporated in a driving system of a robot of the direct teaching type and does not required, when incorporated in such a driving system, a large operating force upon direct teaching of the robot.

In order to attain the objects, according to the present invention, there is provided a speed reduction clutch mechanism which comprises a reduction gear including input and output shafts and a body frame supported for rotation around a common axis, the input shaft being connected to an output shaft of a motor, first arresting means for arresting rotation of the body frame of the reduction gear, second arresting means for coupling, when the first arresting means is not in its arresting condition, the body frame to the output shaft of the reduction gear so as to establish an integrally rotating relationship between the output shaft of the reduction gear and the output shaft of the motor, and switching means for alternatively rendering the first arresting means and the second arresting means operative.

Thus, when rotation of the body frame of the reduction gear is arrested by the first arresting means while the second arresting means is in its non-arresting condition, the output shaft of the reduction gear is rotated at the predetermined reduction ratio with the predetermined output torque by the motor connected to the input shaft of the reduction gear.

On the other hand, the first and second arresting means are alternately rendered operative by the switching means. Thus, when the body frame and the output shaft of the reduction gear are coupled to each other by the second arresting means so that rotation of the output shaft relative to the body frame is arrested while the first arresting means is in its non-arresting condition, the body frame of the reduction gear is in its rotatable condition. Accordingly, the output shaft of the reduction gear can be rotated not via the reduction mechanism within the reduction gear but directly in an integral relationship with and by the output shaft of the motor to which the input shaft of the reduction gear is connected.

Accordingly, where the output shaft of the reduction gear is connected, for example, to a driving force transmitting mechanism of an arm of a robot of the direct teaching type, when direct teaching of the robot is to be effected, the first arresting means is put into its non-arresting condition and the second arresting means is put into its arresting condition.

On the other hand, when playback of the robot is to be effected, the first arresting means is put into its arresting condition and the second arresting means is put into its non-arresting condition.

Accordingly, when the speed reduction clutch mechanism is incorporated in a driving system of a robot of the direct teaching type in this manner, a great operating force is not required upon direct teaching of the robot. Besides, since a detector provided for the motor for detecting a rotational position of the motor can be used both upon direct teaching and upon playback of the robot, the driving system of the robot can be produced at a low cost using the speed reduction clutch mechanism with a simplified construction eliminating a detector for exclusive use in teaching.

It is to be noted that it is a matter of course that a servo motor having a detector for detection of a rotional position of the motor is included in the definition of the motor specified above.

The above and other objects, features and advantages of the present invention will become apparent from the following description and the appended claims, taken in conjunction with the accompanying drawings.

DESCRIPTION OF THE PREFERRED EMBODIMENTS

Figure 1:
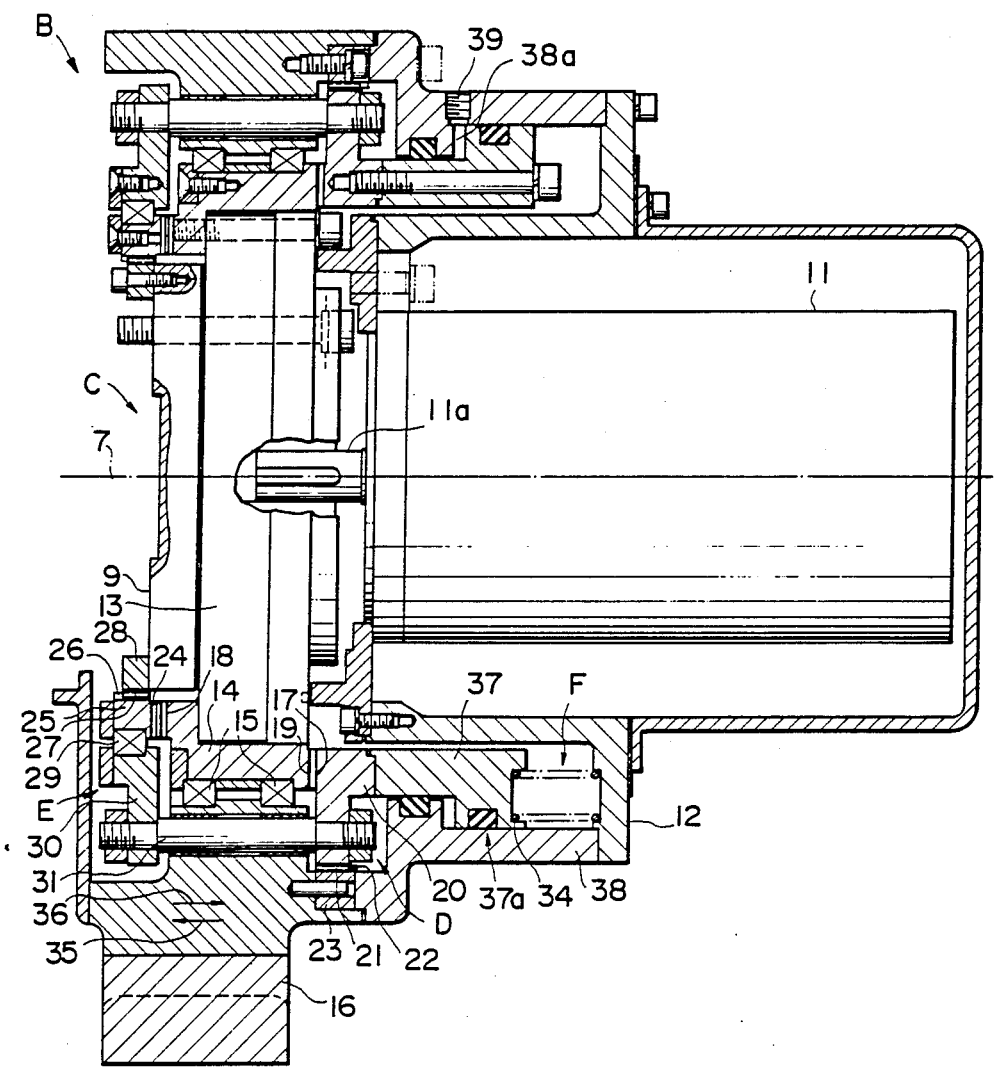
FIG. 1 is a side elevational sectional view of a speed reduction clutch mechanism according to a preferred embodiment of the present invention.
Figure 2:
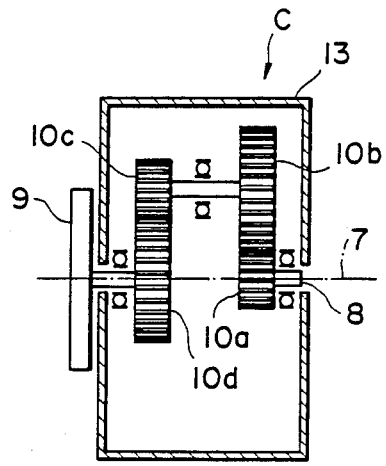
FIG. 2 is a schematic side elevational sectional view of a reduction gear of the speed reduction clutch mechanism of FIG. 1.

Referring first to FIGS. 1 and 2, a speed reduction clutch mechanism generally donated at B has an input shaft 8 and an output shaft 9 which are supported for rotation around a common axis 7. The speed reduction clutch mechanism B includes a reduction gear C for reducing the speed of rotation received at the input shaft 8. The reduction gear C includes a gear wheel 10a mounted on the input shaft 8, an intermediate gear wheel 10b held in meshed engagement with the gear wheel 10a, another intermediate gear wheel 10c mounted for integral rotation with the gear wheel 10b, and a further gear wheel 10d connected to the output shaft 9 and held in meshed engagement with the gear wheel 10c. The input shaft 8 of the reduction gear C is connected to an output shaft 11a of a servo motor 11 which is secured to a motor housing 12. A detector (not shown) is provided for detecting a rotational position of the output shaft 11a of the servo motor 11.

A housing 14 having a substantially cylindrical profile is mounted on an outer periphery of a body frame 13 of the reduction gear C. The housing 14 is supported for rotation around the axis 7 on a clutch housing 16 by means of a pair of bearings 15.

Figure 3A:
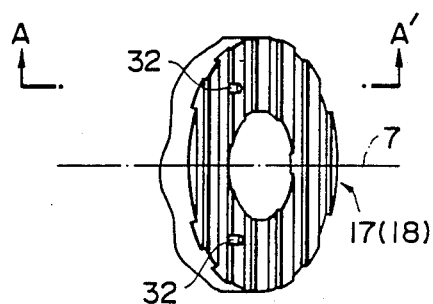
FIG. 3(a) is a partial perspective view of a clutch element employed in the speed reduction clutch mechanism of FIG. 1.
Figure 3B:
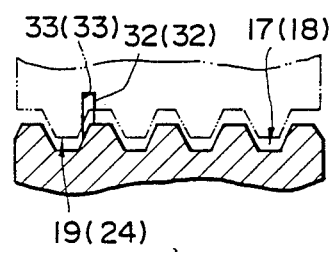
FIG. 3(b) is an enlarged sectional view taken along line A—A' of FIG. 3(a)

Referring also to FIGS. 3(a) and 3(b), a pair of racks 17, 18 are formed on opposite end faces of the housing 14 along the axis 7, and another rack 19 is formed on an end face of a disk 20 in the form of an annular ring for meshing engagement with the rack 17. The disk 20 has a spline 21 formed on an outer periphery thereof and extending in a direction of the axis 7. Another spline 22 for engaging with the spline 21 of the disk 20 to slidably guide the disk 20 in a direction of the axis 7 is formed on an inner periphery of a spline ring 23 secured to the clutch housing 16.

An additional rack 24 is formed on an end face of a rack plate 25 in the form of a cylinder or annular ring for meshing engagement with the other rack 18 of the housing 14. A spline 26 is formed on an inner periphery of the rack plate 25 and extends in a direction of the axis 7. The spine 26 of the rack plate 25 is held in meshing engagement with another spline 27 formed on a spline ring 28 so that the rack plate 25 may be slidably guided in a direction of the axis 7. The spline ring 28 is securely mounted along a circumferential edge of an end face of the output shaft 9 of the reduction gear C.

A disk 30 in the form of an annular ring supports the rack plate 25 for rotation thereon by means of a bearing 29 and is connected in an integral relationship to the disk 20 by means of a plurality of connecting rods 31 which are supported for sliding movement in a direction of the axis 7 in the clutch housing 16.

Thus, a first arresting means D for arresting rotation of the body frame 13 of the reduction gear C is constituted from the rack 17 of the housing 14, the rack 19, disk 20, splines 21, 22, spline ring 23 and so on, and a second arresting means E for coupling the body frame 13 and the output shaft 9 of the reduction gear C to each other when the first arresting means D is in its non-arresting condition is constituted from the rack 18 of the housing 14, the rack 24, rack plate 25, splines 26, 27, spline ring 28 and so on. A clutch mechanism is thus realized including the first and second arresting means D, E.

In order to allow the clutch mechanism to be put into an engaging condition only at a predetermined position within one revolution of the body frame 13 and the output shaft 9 of the reduction gear C when the first or second arresting means D, E is rendered operative, a pair of pins 32 are securely mounted at locations on each of contacting faces of the racks 17, 18 of the housing 14 spaced away from the axis 7 as seen in FIGS. 3(a), 3(b). Meanwhile, a pair of pin holes 33 for fitting engagement with the pins 32 are formed in each of contacting faces of the rack 19 of the disk 10 and the rack 24 of the rack plate 25. Such fitting engagement between the pins 32 and the pin holes 33 and hence meshing engagement between the racks 17 and 19 and between the racks 18 and 24 occur at only one position within one revolution of the housing 14.

It is to be noted that the function attained by the pins 32 and the pin holes 33 may be similarly attained, for example, by a combination of a key and a key way.

Figure 4:
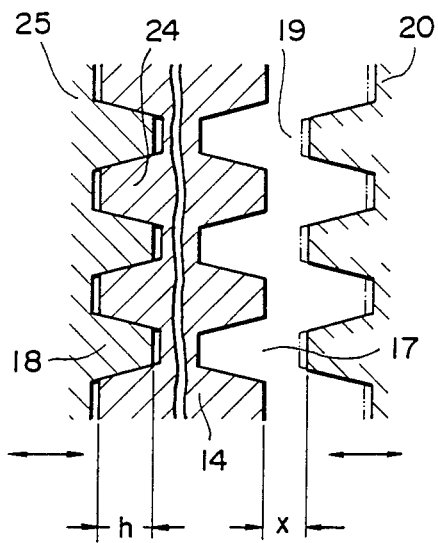
FIG. 4 is schematic illustration showing a meshing relationship of clutch elements of FIG. 3(b)
Figure 6:
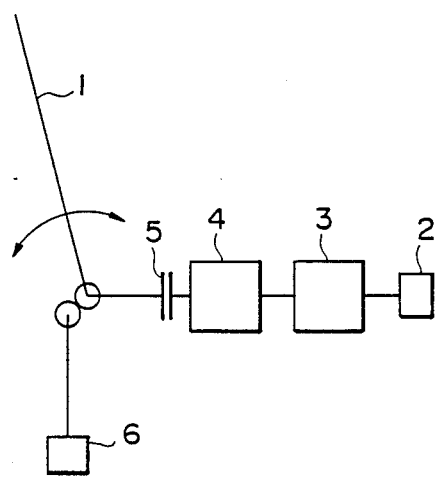
FIG. 6 is a block diagram illustrating a construction of an exemplary driving system of a conventional robot of the direct teaching type.

Here, the relation between the first and second arresting means D, E is such that, when the housing 14 is in a position in which one of the racks 17, 18 thereon is in meshing engagement with the opposing rack 19 or 24 and the other rack 18 or 17 is spaced away from the opposing rack 24 or 19, the dimension x between tops of teeth of the opposing racks spaced from each other is smaller than the height or distance h over which the other opposing racks are in meshing engagement with each other as seen in FIG. 4. Accordingly, at least one of the racks 17, 18 of the housing 14 is always in meshing engagement with the opposing rack 19 or 24, and therefore there is no possibility that the racks 17, 18 of the housing 14 will be completely free from the racks 19 and 24 and brought out of position during sliding movement of the disk 20 and the rack plate 25 when the first switching means D and the second switching means E are switched alternately by a switching means as hereinafter described.

A piston 37 is secured to an end face of the disk 20 and normally urged in a direction of an arrow 35 by a compression spring 34 so as to establish meshing engagement between the rack 17 of the housing 14 and the rack 19 of the disk 20 of the first arresting means D thereby to arrest rotation of the body frame 13 of the reduction gear C. The piston 37 is mounted in sliding engagement at an outer periphery 37a at an end portion thereof with an inner periphery of a cylinder tube 38 so that it is slidably guided by the cylinder tube 38 in a direction of the axis 7.

An air supply port 39 is perforated in a side wall of the cylinder tube 38 and communicates with a gap 38a defined by the cylinder tube 38 and an end face of the piston 37. Thus, as air is supplied via the air supply port 39 into the gap 38a, the piston 37 is slidably moved in a direction of an arrow 36 against the resilient urging force of the spring 34. Consequently, the rack 19 of the disk 20 is brought out of meshing engagement with the rack 17 of the housing 14, thereby bringing the first arresting means D into its nonarresting condition. On the other hand, the rack 18 of the housing 14 and the rack 24 of the rack plate 25 of the second arresting means E are brought into meshing engagement with each other, thereby establishing an engaged or interconnected condition between the body frame 13 and the output shaft 9 of the reduction gear C.

Thus, a switching means F for alternately rendering the first arresting means D and the second arresting means E operative includes the spring 34, piston 37, cylinder tube 38 and related structure.

Now, operation of the speed reduction clutch mechanism B having the construction as described above will be described with reference to FIG. 1.

In the position shown in FIG. 1, the rack 17 of the housing 14 and the rack 19 of the disk 20 of the first arresting means D are held in meshing engagement with each other by an action of the piston 37 resiliently urged in the direction of the arrow mark 35 by the spring 34. Consequently, rotation of the body frame 13 of the reduction gear C is arrested by the disk 20 of the first arresting means D. On the other hand, the rack 18 of the housing 14 and the rack 24 of the rack plate 25 of the second arresting means E are spaced away from each other. Accordingly, the output shaft 9 of the reduction gear C is in a rotatable condition.

Thus, as the servo motor 11 connected to the inapt shaft 8 of the reduction gear C rotates, the output shaft 9 of the reduction gear C is rotated at a predetermined reduction ratio (a preset reduction ratio of the reduction gear C) with a predetermined output torque.

Then, if air is supplied into the gap 38a via the air supply port 39, the piston 37 of the switching means F is slidably moved in the direction of the arrow 36 so that the rack 17 of the housing 14 and the rack 19 of the disk 20 of the first arresting means D are disengaged from each other. Consequently, the body frame 13 of the reduction gear C is put into a rotatable condition. On the other hand, the rack 18 of the housing 14 and the rack 24 of the rack plate 25 of the second arresting means E are engaged with each other thereby to establish an interconnecting relationship between the output shaft 9 and the body frame 13 of the reduction gear C via the spline ring 28, rack plate 25 and housing 14. Consequently, since rotation of the output shaft 9 of the reduction gear C relative to the body frame 13 is prevented, as the body frame 13 of the reduction gear C is rotated by the servo motor 11, the output shaft 9 of the reduction gear C is rotated not via the reduction mechanism within the reduction gear C but directly in an integral relationship by the output shaft 11a of the servo motor 11.

Thus, where the output shaft 9 of the reduction gear C is connected, for example, to a driving force transmitting mechanism of an arm of a robot of the direct teaching type (not shown), when direct teaching of the robot is to be effected, the first arresting means D is put into its non-arresting condition and the second arresting means E is put into its arresting condition.

As a result, the output shaft 11a of the servo motor 11 will be rotated not via the reduction mechanism of the reduction gear C but directly at a reduction ratio of 1:1 with respect to the output shaft 9 of the reduction gear C. Accordingly, an operator can operate the arm with a very small operating force. Meanwhile, the teaching position of the arm then is converted into position information by the aforementioned detector (not shown) of the servo motor 11 and is transmitted to the aforementioned controlling device (not shown).

On the other hand, when playback of the robot is to be effected, the first arresting means D is put into its arresting condition and the second arresting means E is put into its non-arresting condition by allowing air to pass out of the gap 38a through the air supply port 39. As a result, the arm will be moved at the predetermined reduction ratio with the predetermined driving torque under the control of the controlling device and the detector for detection of a rotational position of the servo motor 11 described above. Thus, by applying the speed reduction clutch mechanism B to a robot of the direct teaching type, a single detector can be used commonly for direct teaching and for playback.

Further, since meshing engagement between the body frame 13 and the output shaft 9 of the reduction gear C occurs at only one position during one revolution of either element as described hereinbefore when the first or second arresting means D, E operates and the dimension x between tops of teeth of the opposing racks spaced away from each other is smaller than the height h over which the other opposing racks are in meshing engagement with each other, position data upon teaching of the robot and position data upon playback are mechanically compatible with each other. Further, there is no possibility that the racks 17, 18 of the housing 14 will be completely disengaged from the racks 19 and 24 and brought out of position during sliding movement of the disk 20 and the rack plate 25.

It is to be noted that while in the embodiment described above the first and second arresting means D, E are driven by the common switching means F, it is a matter of course that independent switching means may be provided for the individual first and second arresting means D, E.

Further, in the speed reduction clutch mechanism B of the construction described above, switching between the first and second arresting means D, E is effected by supplying air, and thereupon both the rational frequency and the driving torque of the output shaft 9 of the reduction gear C are varied. Accordingly, by operating the switching means F, upon remote teaching, so that the arm may be driven at the reduction ratio of 1:1 with the driving torque reduced, eventual the likelihood of damage when the arm collides with an operator or a peripheral device due to an error can be controlled so as to be as low as possible.

Now, a speed reduction clutch mechanism according to another preferred embodiment of the present invention will be described with reference to FIG. 5. It is to be noted that since the speed reduction clutch mechanism of the present invention is somewhat similar in construction to the speed reduction clutch mechanism of the preceding embodiment, like parts or elements are denoted by like reference symbols to those of the preceding embodiment, and a detailed description thereof will be omitted herein to avoid redundancy.

The speed reduction clutch mechanism generally denoted at G is generally construction such that a body frame 13 of a reduction gear C can be slidably moved in a direction of an axis 7 by a predetermined stroke (a stroke necessary for switching between a first switching means D and a second switching means E hereinafter described) relative to an output shaft 9 of the reduction gear C. A housing 14 having a cylindrical profile is mounted on the outer periphery of the body frame 13 and is supported for rotation by means of a plurality of cam followers 41 mounted on an inner periphery of a support member 44 which has a cylindrical profile and is secured to a disk 20. It is to be noted that the disk 20 is supported for sliding movement in a direction of the axis 7 by means of a pin 45 securely mounted on a clutch housing 16.

A groove 43 is formed in an outer periphery of the housing 14, and a plurality of cam followers 42 are mounted on the inner periphery of the support member 44 and are fitted in the groove 43 so that as the cam followers 42 move in the direction of the axis 7, the housing 14 may be slidably moved in the same direction.

A rack 17 is formed on an end face of the housing 14, and a body frame arresting plate 46 is secured to the clutch housing 16 and has a rack 19 formed therein for meshing engagement with the rack 17. Further, an output shaft arresting plate 47 is mounted on the end face of the housing 14 and has a rack 18 formed thereon. A rack plate 25 is secured to the output shaft 9 of the reduction gear C and has a rack 24 formed thereon for meshing engagement with the rack 18. In this instance, a first arresting means D for arresting rotation of the body frame 13 of the reduction gear C is constituted by the rack 17 of the housing 14, rack 19, body frame arresting plate 46 and related structure, and a second arresting means E for coupling the body frame 13 and the output shaft 9 of the reduction gear C to each other when the first arresting means D is in its non-arresting condition is constituted by the rack 18 of the output shaft arresting plate 47 mounted on the housing 14, rack 24, rack plate 25 and related structure.

Figure 5:
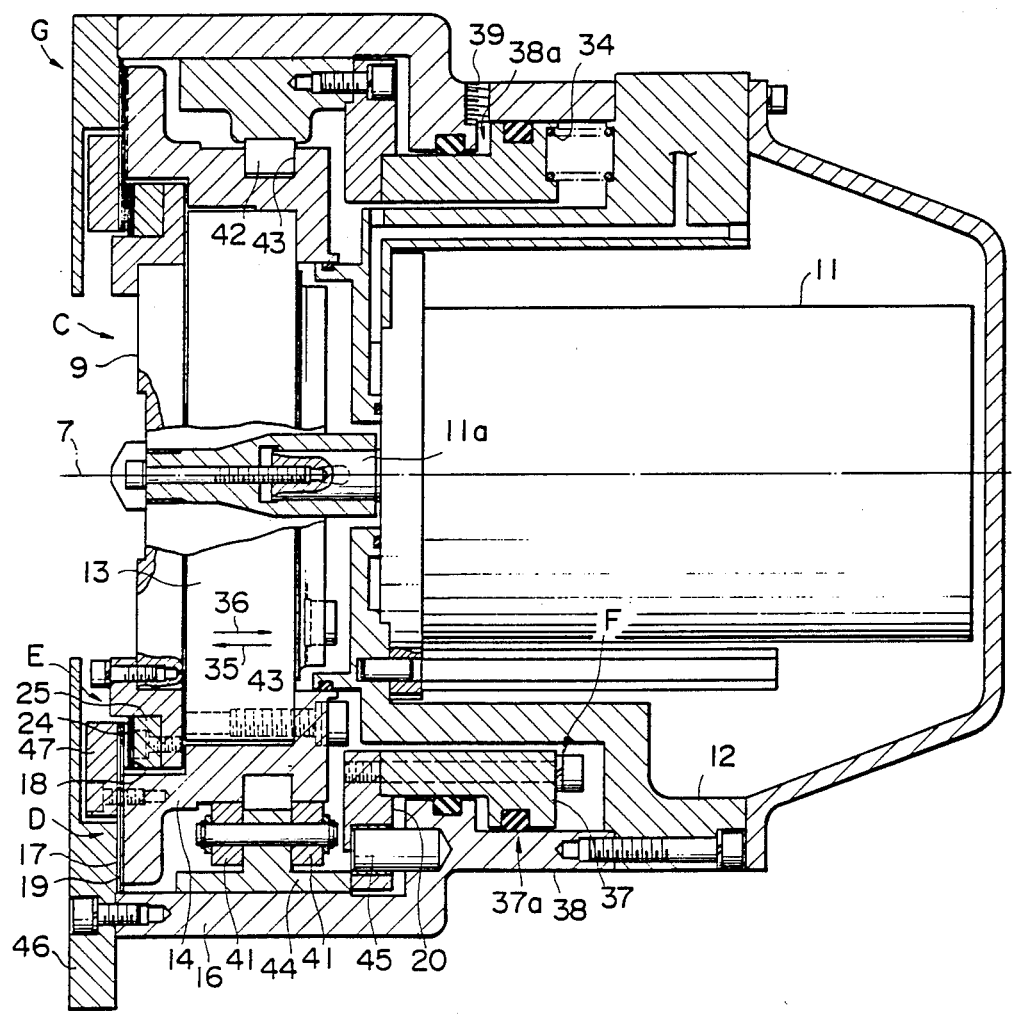
FIG. 5 is a view similar to FIG. 1 but showing a speed reduction clutch mechanism according to another preferred embodiment of the present invention.

In the speed reduction clutch mechanism G having the construction as described above, similarly as in the case of the speed reduction clutch mechanism B described above, as air is supplied via an air supply port 39 into a gap 38a when the body frame 13 of the reduction gear C is arrested from rotation by the first arresting means D as seen in FIG. 5, the piston 37 of the switching means F is slidably moved in a direction of an arrow mark 36 so that the first arresting means D is put into its non-arresting condition and on the other hand the second arresting means E is put into its arresting condition. Accordingly, rotation of the output shaft 9 relative to the body frame 13 is prevented.

Accordingly, also in the speed reduction clutch mechanism G according to the construction described above, similar functions and effects to those of the preceding speed reduction clutch mechanism B can be anticipated.

Having now fully described the invention, it will be apparent to one of ordinary skill in the art that may changes and modifications can be made thereto without departing from the spirit and scope of the invention as set forth herein.

What is claimed is:

1. A speed reduction clutch mechanism, comprising:
   a motor having an output shaft;
   a reduction gear including input and output shafts and a body frame supported for rotation around a common axis, said input shaft being connected to said output shaft of said motor;
   first arresting means for arresting rotation of said body frame of said reduction gear;
   second arresting means for coupling, when said first arresting means is not in an arresting condition, said body frame to said output shaft of said reduction gear so as to establish an integrally rotating relationship between said output shaft of said reduction gear and said output shaft of said motor;
   switching means for alternately rendering said first arresting means and said second arresting means operative; and
   a robot of a direct teaching type having an arm with a driving force transmitting mechanism wherein said output shaft of said reduction gear is connected to said driving force transmitting mechanism of said arm of said robot.

2. A speed reduction clutch mechanism according to claim 1, further comprising a detector for detecting a rotational position of said motor and which is connected to said motor for utilization both upon direct teaching and upon playback of the robot.

3. A speed reduction clutch mechanism according to claims 1 or 2, further comprising means for integrally connecting said first arresting means and said second arresting means and for meshing with said body frame and said output shaft of said reduction gear at predetermined positions of one revolution.

4. A speed reduction clutch mechanism according to claim 1, wherein said first and second arresting means comprises a common element mounted for integral rotation with said body frame of said reduction gear, and said first arresting means comprises a fixed element for cooperating with said common element while said second arresting means comprises a rotatable element for cooperating with said common element, said rotatable element being mounted for integral rotation with said output shaft of said reduction gear, one of said common element and said fixed and rotatable elements of said first and second arresting means being connected to said switching means.

5. A speed reduction clutch mechanism according to claim 4, wherein one of said common element and said fixed and rotatable elements of said first and second arresting means connected to said switching means are mounted for movement along said common axis of said reduction gear such that when said one of said common element and said fixed and rotatable elements are moved in one direction along said common axis, said common element and said fixed element are brought into meshing engagement with each other whereas said common element and said rotatable element are brought into meshing engagement with each other when said one of said common and said fixed and rotatasble elements are moved in an opposite direction.

6. A speed reduction clutch mechanism according to claim 5, further comprising means for continuously maintaining said common element in meshing engagement with at least one of said fixed and rotatable elements.

7. A speed reduction clutch mechanism according to claim 5, wherein said fixed element of said first arresting means and said rotatable element of said second arresting means are located at opposite positions with respect to said common element in the direction of said common axis of said reduction gear.

8. A speed reduction clutch mechanism according to claim 5, wherein said fixed element of said first arresting means and said rotatable element of said second arresting means are located on a same side of the said common element along said common axis of said reduction gear so that meshing engagement of said common element with said fixed and rotatable elements occur in planes very near to each other.

9. A speed reduction clutch mechanism according to claim 5, wherein said fixed and rotatable elements of said first and second arresting elements are connected to said switching means, and said second arresting means comprises an annular element secured to said output shaft of said reduction gear and held in normal meshing engagement with said rotatable element for establishing an integrally rotating relationship between said output shaft and said rotatable element at any position of said rotatable element.

10. A speed reduction clutch mechanism according to claim 5, wherein said common element is connected to said switching means, and said rotatable element is secured to said output shaft of said reduction gear.

11. A speed reduction clutch mechanism according to any one of claims 5 to 10, wherein said switching means comprises a spring for urging said common element or said fixed and rotatable elements in one direction along said common axis of said reduction gear, and selectively operable pneumatic means for moving said common element or said fixed and rotatable elements in the opposite direction against the urging force of said spring.

* * * * *